Figure 1:
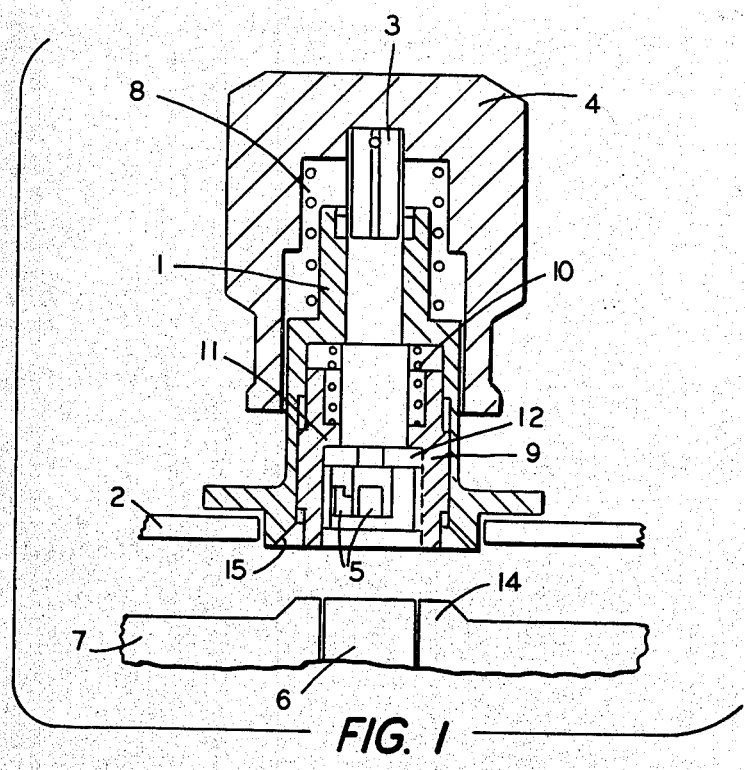

United States Patent [19]
Bennett

[11] 4,366,688
[45] Jan. 4, 1983

[54] MOUNTINGS FOR KEYS

[75] Inventor: Geoffrey R. Bennett, Reading, England

[73] Assignee: Unimax Switch Limited, Maidenhead, England

[21] Appl. No.: 182,225

[22] Filed: Aug. 28, 1980

[30] Foreign Application Priority Data

Aug. 31, 1979 [GB] United Kingdom ............... 7930348

[51] Int. Cl.³ .............................................. E05B 19/00
[52] U.S. Cl. ..................................... 70/395; 70/397; 70/398
[58] Field of Search ................. 70/395, 397, 398, 419, 70/421

[56] References Cited

U.S. PATENT DOCUMENTS

| 14,059 | 1/1856 | Harrison | 70/395 |
| 1,237,115 | 8/1917 | Stein | 70/395 |
| 4,018,069 | 4/1977 | Lipschutz | 70/395 |

FOREIGN PATENT DOCUMENTS 1260322  1/1972  United Kingdom .................. 70/421

OTHER PUBLICATIONS

Unimax Publication Date–prior to Mar. 29, 1982 submitted with application No. 182,225.

Primary Examiner—Robert L. Wolfe
Attorney, Agent, or Firm—Bernard Malina

[57] ABSTRACT

A key rotatably supported in a mounting and capable of being brought into engagement with a lock is held in the correct orientation for engaging the lock by being locked to the mounting by a retractable sleeve. Only when the mounting is brought into engagement with the lock does a portion of the lock engage the sleeve and push it back relative to the mounting to free the key for rotation. The mounting may be on a moveable part of a machine guard with the lock on a fixed part and controlling operation of the machine.

7 Claims, 2 Drawing Figures

MOUNTINGS FOR KEYS

This invention relates to a mounting for a key used in saftey equipment for guarding and isolating machinery and other equipment that it is necessary to protect from access except when in a safe condition. It is known to have a lock controlling a switch, valve, linkage or other means of setting the machinery in motion, this lock being mounted in a position where it can only be operated by a key, which is permanently mounted on a hinged or similarly mounted guard, when that guard is fully closed. The key is mounted to be rotatable in the guard, and possibly axially movable, but is captive i.e. it cannnot be detached from the guard; the guard can only be opened to obtain access to the machinery when the key has first been turned to the 'off' or 'safe' position.

In the known arrangement the key is free to rotate in the guard and so while the guard is open it may be turned inadvertently, with the result that when an attempt is made to close the guard, especially if it is closed roughly, the wards on the key may be damaged by impact with the keyhole plate of the lock.

According to the invention this difficulty is overcome by providing a mounting for a rotatable key, the key having wards for engaging co-operating surfaces in an associated lock, and the key being rotatable in the mounting, in which the key is locked against rotation by a movable member that locks the key to the mounting in an angular position in which the key is correctly orientated for engaging the lock when the mounting is brought towards the lock, the movable member being engagable by a surface on the lock, when the key and lock are brought together, such as to displace the member and thereby free the key for rotation within the mounting.

In a preferred arrangement the movable member is a spring-loaded sleeve, and this sleeve is itself automatically engaged and pushed back, to free the key for angular movement, as it engages the bezel or keyhole plate when the guard is closed.

Figure 2:
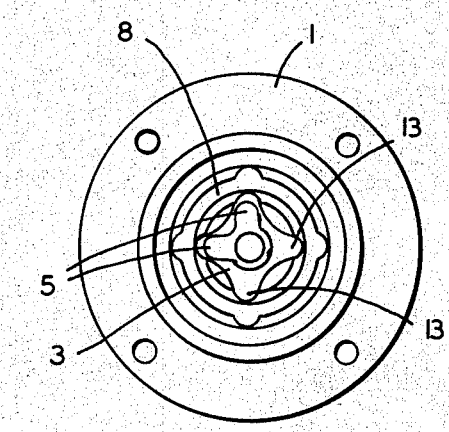

An example of a mounting in accordance with the invention is illustrated in the accompanyimg drawings, in which:

FIG. 1 is a cross-section through the key and its mounting and the associated lock, and FIG. 2 is an axial view, looking from below in FIG. 1, showing the key and its mounting alone.

A cylindrical body 1 is flanged for mounting on the guard 2 or other movable part of the equipment the position of which part has to be determined before the access control lock is operated. A key 3 is mounted in the body 1 to be rotatable and also axially slidable, and secured to its outer end is an operating knob 4. Its inner end carries wards or bits 5 for engaging in a lock 6 on the machine, part of which is shown at 7. A coil spring 8 urges the key axially to an outermost limiting position, shown in the drawings.

Within the body 1 there is a sleeve 9 which is externally splined to prevent it rotating in the body 1 but is axially slidable and urged downwards (as viewed in FIG. 1) by a coil spring 10. This causes an internal flange 11 on the sleeve to engage a collar 12 on the key, this collar having splines 13 (see FIG. 2) which engage the sleeve to prevent the key being rotated within the sleeve.

If the key is pushed downwards against the action of the spring 8 by means of the knob 4, even to the limit of its travel, the key remains in splined engagement with the sleeve and cannot be turned. This ensures that during opening of the guard 2 or other component, when the user may be holding the knob 4 and even pressing on it, the key remains in its correct alignment.

Only when the guard 2 or other component is closed, bringing the mounting body 1 into contact with the bezel or keyhole plate 14 around the lock 6 on the fixed part of the machine 7, is the sleeve 9 pushed back into the body 1 by the bezel or keyhole plate 14, allowing a conical seating 15 in the body to locate on the bezel or keyhole plate 14. Then when the knob 4 is pressed inwards the key is disengaged from the internal splines in the sleeve and is free to turn.

It will be appreciated, therefore, that the key can only turn when it is in the lock, and it can only be disengaged from the lock when it is in the correct alignment, with the lock in a position that makes the machinery safe. Thereafter, as long as the key is out of the lock, it is held against rotation, so that it remains in the correct alignment for subsequent re-engagement with the lock.

I claim:

1. A key mounting and lock combination comprising a lock, a mounting movable relative to said lock in guided path towards and away from said lock, a key rotatable in said mounting, about an axis, wards on said key, formations in said lock cooperating with said wards in a given relative orientation thereof about said axis, a member movable within said mounting between a first position in which said member keys said key to said mounting to prevent rotation of said key and a second position in which said key is free to rotate, said key, when said member is in said first position, being held in an angular position such as to result in said given relative orientation of said wards and co-operating formations, and a surface on said lock co-operating with said movable member to move said member from said first position to said second position on approach of said mounting to said lock.

2. A key mounting and lock combination according to claim 1 wherein said movable member is spring-urged from said second position towards said first position.

3. A key mounting and lock combination as set forth in claim 2 wherein said movable member is movable in a direction parallel to said axis.

4. A key mounting and lock combination as set forth in claim 3 wherein said movable member is a sleeve concentric with said axis.

5. A key mounting and lock combination as set forth in claim 4 wherein said sleeve is permanently keyed to said mounting to prevent rotation of said sleeve in said mounting.

6. A key mounting and lock combination as set forth in claim 4 wherein said lock includes a raised bezel and wherein said surface in said lock is a surface of said bezel.

7. A key mounting and lock combination as set forth in claim 1 wherein said key is axially movable in said mounting between a retracted position and an advanced position and is spring-urged towards said retracted position, and wherein said movable member, when in said first position, keys said key to said mounting to prevent rotation of said key, throughout the axial movement of said key.

* * * * *